(12) United States Patent  (10) Patent No.: US 10,340,772 B2
Malwitz et al.  (45) Date of Patent: Jul. 2, 2019

(54) ELECTRONICALLY COMMUTATED FAN MOTORS AND SYSTEMS

(71) Applicant: Orange Motor Company L.L.C., Maple Grove, MN (US)

(72) Inventors: Bruce Gerald Malwitz, Buffalo, MN (US); Brian Weldon Jacobs, Maple Grove, MN (US)

(73) Assignee: Orange Motor Company L.L.C., Maple Grove, MN (US)

( * ) Notice: Subject to any disclaimer, the term of this patent is extended or adjusted under 35 U.S.C. 154(b) by 0 days.

(21) Appl. No.: 15/047,857

(22) Filed: Feb. 19, 2016

(65) Prior Publication Data

US 2016/0178227 A1   Jun. 23, 2016

Related U.S. Application Data

(63) Continuation of application No. 14/757,669, filed on Dec. 23, 2015.

(Continued)

(51) Int. Cl.
*F04D 19/00* (2006.01)
*F04D 25/16* (2006.01)
(Continued)

(52) U.S. Cl.
CPC .......... *H02K 11/20* (2016.01); *F04D 19/005* (2013.01); *F04D 25/166* (2013.01); *F25B 49/02* (2013.01);
(Continued)

(58) Field of Classification Search
CPC ...... F04D 19/005; H02K 11/20; H02K 11/21; H02K 11/30; H02K 11/33; H02K 11/35;
(Continued)

(56) References Cited

U.S. PATENT DOCUMENTS 1,923,145 A  *  8/1933  Harsch .................. C21D 9/663
                                                                148/206
2,100,923 A  *  11/1937  Schmidt ............... F04D 29/646
                                                                416/246

(Continued)

OTHER PUBLICATIONS

ECM Motor ECM / ECM-DX Series.*

(Continued)

*Primary Examiner* — Marc E Norman
*Assistant Examiner* — Nelson J Nieves
(74) *Attorney, Agent, or Firm* — Pauly, DeVries Smith & Deffner LLC (57) ABSTRACT

Embodiments herein include electronically commutated ("EC") motors, fans operated by such motors, cooling systems including the same, and related methods. In an embodiment, an electronically commutated fan motor is included. The fan motor can include a housing comprising an exterior wall, a shaft, a shaft drive assembly rotatably coupled to the shaft, a power input connector, a control input connector, a switch comprising a base and an actuator accessible outside the housing, the actuator comprising a first actuator position and a second actuator position. The fan motor can also include a controller configured to control the shaft drive assembly based on a control signal from the control input connector, a power signal from the power input connector, and a switch signal from the switch. Other embodiments are also included herein.

11 Claims, 6 Drawing Sheets

Related U.S. Application Data (60) Provisional application No. 62/095,797, filed on Dec. 23, 2014.

(51) Int. Cl.

| | |
|---|---|
| *F04D 27/00* | (2006.01) |
| *F25B 49/02* | (2006.01) |
| *F25D 17/06* | (2006.01) |
| *H02K 11/00* | (2016.01) |
| *H02K 11/20* | (2016.01) |
| *H02K 11/28* | (2016.01) |
| *H02K 11/33* | (2016.01) |
| *H02K 33/12* | (2006.01) |
| *H02P 1/00* | (2006.01) |
| *H02P 6/30* | (2016.01) |

(52) U.S. Cl.
CPC ....... *F25D 17/067* (2013.01); *H02K 11/0094* (2013.01); *H02K 11/28* (2016.01); *H02K 11/33* (2016.01); *H02K 33/12* (2013.01); *H02P 1/00* (2013.01); *H02P 6/30* (2016.02); *F04D 27/004* (2013.01); *F25B 2600/112* (2013.01); *Y02B 30/743* (2013.01)

(58) Field of Classification Search
CPC ........... F25D 17/067; F25D 2317/0684; F25B 2600/112
USPC .................................................. 417/326, 423
See application file for complete search history.

(56) References Cited

U.S. PATENT DOCUMENTS

| | | | | |
|---|---|---|---|---|
| 2,867,377 | A * | 1/1959 | Lasko | F04D 29/646 |
| | | | | 417/234 |
| 2,921,147 | A * | 1/1960 | Hutt | H01H 19/56 |
| | | | | 200/1 V |
| 2,950,667 | A * | 8/1960 | Rose | F24F 11/30 |
| | | | | 454/202 |
| 3,422,296 | A * | 1/1969 | Frank | H01H 9/063 |
| | | | | 200/332.2 |
| 3,991,819 | A * | 11/1976 | Clark | F25B 29/00 |
| | | | | 165/59 |
| 4,015,182 | A | 3/1977 | Erdman et al. | |
| 4,459,519 | A | 7/1984 | Erdman | |
| 4,494,055 | A | 1/1985 | Bitting et al. | |
| 4,500,821 | A * | 2/1985 | Bitting | H02P 6/08 |
| | | | | 318/400.05 |
| 4,555,654 | A * | 11/1985 | Spradling | H02P 23/24 |
| | | | | 318/751 |
| 4,856,286 | A | 8/1989 | Sulfstede et al. | |
| 5,023,527 | A | 6/1991 | Erdman et al. | |
| 5,095,711 | A | 3/1992 | Marris et al. | |
| 5,448,141 | A * | 9/1995 | Kelley | H02P 6/34 |
| | | | | 318/400.01 |
| 5,522,919 | A * | 6/1996 | Sargent | B01D 46/02 |
| | | | | 95/273 |
| 5,533,352 | A | 7/1996 | Bahel et al. | |
| 5,573,382 | A * | 11/1996 | Girard | F04D 27/004 |
| | | | | 200/52 R |
| 5,711,159 | A | 1/1998 | Whipple et al. | |
| 6,271,638 | B1 * | 8/2001 | Erdman | H02K 11/40 |
| | | | | 318/400.01 |
| 6,348,752 | B1 | 2/2002 | Molnar et al. | |
| 6,369,536 | B2 | 4/2002 | Beifus et al. | |
| 6,392,372 | B1 | 5/2002 | Mays et al. | |
| 6,414,408 | B1 | 7/2002 | Molnar et al. | |
| 6,479,957 | B1 | 11/2002 | Molnar et al. | |
| 6,545,438 | B1 | 4/2003 | Mays et al. | |
| RE38,406 | E | 1/2004 | Faris et al. | |
| 6,713,977 | B1 | 3/2004 | Sutter et al. | |
| 6,792,769 | B2 | 9/2004 | Trulaske et al. | |
| 6,895,176 | B2 | 5/2005 | Archer et al. | |
| 7,019,479 | B2 | 3/2006 | Tobias et al. | |
| 7,208,895 | B2 | 4/2007 | Marcinkiewicz et al. | |
| 7,312,970 | B2 | 12/2007 | Skinner et al. | |
| 7,626,349 | B2 | 12/2009 | Marcinkiewicz et al. | |
| 8,120,298 | B2 | 2/2012 | Lelkes et al. | |
| 8,241,008 | B2 | 8/2012 | Tsai et al. | |
| 10,056,807 | B2 | 8/2018 | Malwitz et al. | |
| 2003/0098660 | A1 | 5/2003 | Erdman et al. | |
| 2004/0156716 | A1 * | 8/2004 | Kim | A61L 9/122 |
| | | | | 415/206 |
| 2006/0117769 | A1 * | 6/2006 | Helt | F24F 11/0001 |
| | | | | 62/161 |
| 2006/0169789 | A1 * | 8/2006 | Barsun | G06F 1/20 |
| | | | | 236/49.3 |
| 2008/0236180 | A1 | 10/2008 | Tran et al. | |
| 2009/0060478 | A1 * | 3/2009 | Lin | H02P 7/29 |
| | | | | 388/825 |
| 2010/0034677 | A1 * | 2/2010 | Uselton | F04D 25/022 |
| | | | | 417/423.1 |
| 2010/0115972 | A1 | 5/2010 | Lee et al. | |
| 2010/0192618 | A1 * | 8/2010 | Zolli | F25B 49/02 |
| | | | | 62/428 |
| 2011/0005245 | A1 | 1/2011 | Pussell et al. | |
| 2011/0011465 | A1 * | 1/2011 | Wang | F04B 49/08 |
| | | | | 137/224 |
| 2011/0018473 | A1 | 1/2011 | Rockenfeller et al. | |
| 2011/0302939 | A1 * | 12/2011 | Rockenfeller | H02P 1/30 |
| | | | | 62/89 |
| 2012/0210736 | A1 | 8/2012 | Rockenfeller et al. | |
| 2012/0212166 | A1 * | 8/2012 | Merkel | F24F 11/0079 |
| | | | | 318/400.08 |
| 2012/0262101 | A1 | 10/2012 | Rudich et al. | |
| 2013/0160473 | A1 | 6/2013 | Hu et al. | |
| 2014/0210321 | A1 * | 7/2014 | Dixon | H02K 5/136 |
| | | | | 310/68 R |
| 2014/0311140 | A1 * | 10/2014 | Hyodo | F01P 7/044 |
| | | | | 60/489 |
| 2015/0338111 | A1 * | 11/2015 | Havard | F24F 1/38 |
| | | | | 165/287 |
| 2016/0178266 | A1 | 6/2016 | Malwitz et al. | |

OTHER PUBLICATIONS

Gupta, Nitin et al., "Fundamentals of the Automotive Cabin Climate Control System," Dec. 21, 2012 (6 pages).
"Overview of ECM Technology," GE ECM by Regal-Beloit, (2007), pp. 1-2.
"The ECM Textbook," GE ECM by Regal-Beloit, (2007), www.thedealertoolbox.com, (21 pages).
"Using ECM Motors in HVAC Systems," http://www.thomasnet.com/articles/machinery-tools-supplies/ECM-Motors-HVAC-Systems, Dec. 15, 2014 (1 page).
"Non-Final Office Action," for U.S. Appl. No. 14/757,669, dated May 20, 2016 (10 pages).
"Response to Non-Final Office Action," for U.S. Appl. No. 14/757,669, dated May 20, 2016 and filed with the USPTO (7 pages).
"Notice of Allowance," for U.S. Appl. No. 14/757,669 dated Jun. 6, 2018 (17 pages).
"Response to Final Office Action," for U.S. Appl. No. 14/757,669, dated Dec. 19, 2017 and filed with the USPTO Mar. 29, 2018 (15 pages).
"Understanding Fan Blade Rotation," //www.mankatorefrigeration.com/blog/understanding-fan-blade-rotation#comments, Jan. 2014, 3 pages.
"Final Office Action," for U.S. Appl. No. 14/757,669 dated Dec. 19, 2017 (15 pages).
"Response to Non-Final Office Action," for U.S. Appl. No. 14/757,669, dated Apr. 17, 2017 and filed with the USPTO Aug. 7, 2017 (12 pages).
"Final Office Action," for U.S. Appl. No. 14/757,669 dated Sep. 20, 2016 (13 pages).
"Non-Final Office Action," for U.S. Appl. No. 14/757,669 dated Apr. 17, 2017 (16 pages).

(56) References Cited

OTHER PUBLICATIONS

"Response to Final Office Action," for U.S. Appl. No. 14/757,669, dated Sep. 20, 2016 and filed with the USPTO Feb. 21, 2017 (12 pages).

* cited by examiner

ELECTRONICALLY COMMUTATED FAN MOTORS AND SYSTEMS

This application is a continuation of U.S. application Ser. No. 14/757,669, filed Dec. 23, 2015, which claims the benefit of U.S. Provisional Application No. 62/095,797, filed Dec. 23, 2014, the contents of which are herein incorporated by reference in their entireties.

FIELD

This application relates to electronically commutated ("EC") motors, fans operated by such motors, cooling systems including the same, and related methods.

BACKGROUND

Cooling systems, including refrigeration systems and other types of HVAC systems, typically include one or more fans to generate air flow across an evaporator and/or condenser. Cooling systems can be used in many different settings including domestic settings and commercial settings.

The fans of cooling systems are typically driven by electric motors. The electric motors draw current and are responsible for a large portion of the energy consumed by cooling systems. As such, efforts to improve the energy efficiency of cooling systems should consider energy consumed by such electric motors.

At a basic level, an electric motor is an electrical machine that converts electrical energy into mechanical energy. There are many different types of electric motors known. However, at a high level, electric motors are categorized as either DC motors or AC motors depending on the current they are designed to use. While many design variants exists, most motors include common basic elements such as a rotor, stator, windings, and a commutator.

SUMMARY

Embodiments herein include electronically commutated ("EC") motors, fans operated by such motors, cooling systems including the same, and related methods. In an embodiment, an electronically commutated fan motor is included. The fan motor can include a housing comprising an exterior wall, a shaft, a shaft drive assembly rotatably coupled to the shaft, a power input connector, a control input connector, a switch comprising a base and an actuator accessible outside the housing, the actuator comprising a first actuator position and a second actuator position. The fan motor can also include a controller configured to control the shaft drive assembly based on a control signal from the control input connector, a power signal from the power input connector, and a switch signal from the switch. Operation of the shaft drive assembly and the shaft can be characterized by a rotation speed and a rotation direction. The controller can be configured to control the rotation direction of the shaft drive assembly and the shaft based on the switch signal and the power signal but not the control signal.

In an embodiment, a method for adjusting airflow within a cooling system is included. The method can include accessing a blower fan forming part of a cooling system comprising a refrigerant line coupling a compressor, a condenser, an expansion valve, and an evaporator. The method can include manually actuating a switch of the blower fan, the switch controlling a rotational direction of the blower fan. In some embodiments, actuating the switch is the only method of controlling the rotational direction of the blower fan.

In an embodiment, a cooling system is included. The cooling system can include a refrigerant line coupling a compressor, a condenser, an expansion valve, and an evaporator. The cooling system can also include a blower fan including a fan motor. The fan motor can include a housing comprising an exterior wall, a shaft, a shaft drive assembly rotatably coupled to the shaft, a power input connector, a control input connector, a switch comprising a base and an actuator accessible outside the housing, the actuator comprising a first actuator position and a second actuator position. The fan motor can also include a controller configured to control the shaft drive assembly based on a control signal from the control input connector, a power signal from the power input connector, and a switch signal from the switch. Operation of the shaft drive assembly and the shaft can be characterized by a rotation speed and a rotation direction. The controller can be configured to control the rotation direction of the shaft drive assembly and the shaft based on the switch signal and the power signal but not the control signal. The cooling system can also include a cooling system control circuit electrically coupled to the fan motor, the control circuit configured to provide a control signal to the control input connector for adjusting a speed of the blower fan. In some embodiments, the control circuit of the cooling system is not configured to change the rotational direction of the fan motor.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following drawings, in which.

While embodiments are susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

The embodiments described herein are not intended to be exhaustive or to limit the invention to the precise forms disclosed in the following detailed description. Rather, the embodiments are chosen and described so that others skilled in the art can appreciate and understand the principles and practices.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Cooling systems, including refrigeration systems and other types of HVAC systems, can include one or more fans to generate air flow across an evaporator and/or condenser. In some embodiments a cooling system can include an electronic control circuit that modulates the speed of such a blower fan. For example, a control circuit can adjust the level of a control signal in order to adjust the speed of an electronically commutated fan motor.

In some cases the control circuit can also be configured to change the rotational direction of the fan. A programmer device can be used to configure the electronic control of a cooling system. Such a configuration can include changing the direction of rotation of a fan through an electronic control signal sent by the control circuit to the fan. The use of a programmer can be effective to provide a high level of control over the operation of the motor, but it can make certain adjustments more burdensome because of the need for a programmer device. Further, it can make certain operational characteristics less apparent to an observer of the motor.

As such, in some embodiments, motors herein can combine aspects of the degree of control provided by configuring the motor with a programmer device along with the ease of making at least some adjustments and the enhanced awareness of a setting, such as the direction of rotation, through an external device, such as a switch or button. Thus, in some embodiments, an electronically commutated fan motor is included that has a switch or a button comprising a base and an actuator accessible outside the housing. Moving the actuator between a first actuator position and a second actuator position can be effective to change the direction of rotation of the motor. In specific, moving the actuator between a first actuator position and a second actuator position can be effective to send a signal, such as a switch signal, to a controller or control circuit configured to control a shaft drive assembly. It will be appreciated that there are many different signals that can be provided as a switch signal. In some embodiments, the switch signal can be a signal having a voltage level between −10 VDC and 10 VDC. When the switch actuator is moved back to the other position, then the signal can be withdrawn. In some embodiments, when the actuator is moved between a first actuator position and a second actuator position the switch signal can be conveyed to a pin on a controller or connected to a control circuit configured to control a shaft drive assembly.

Figure 1:
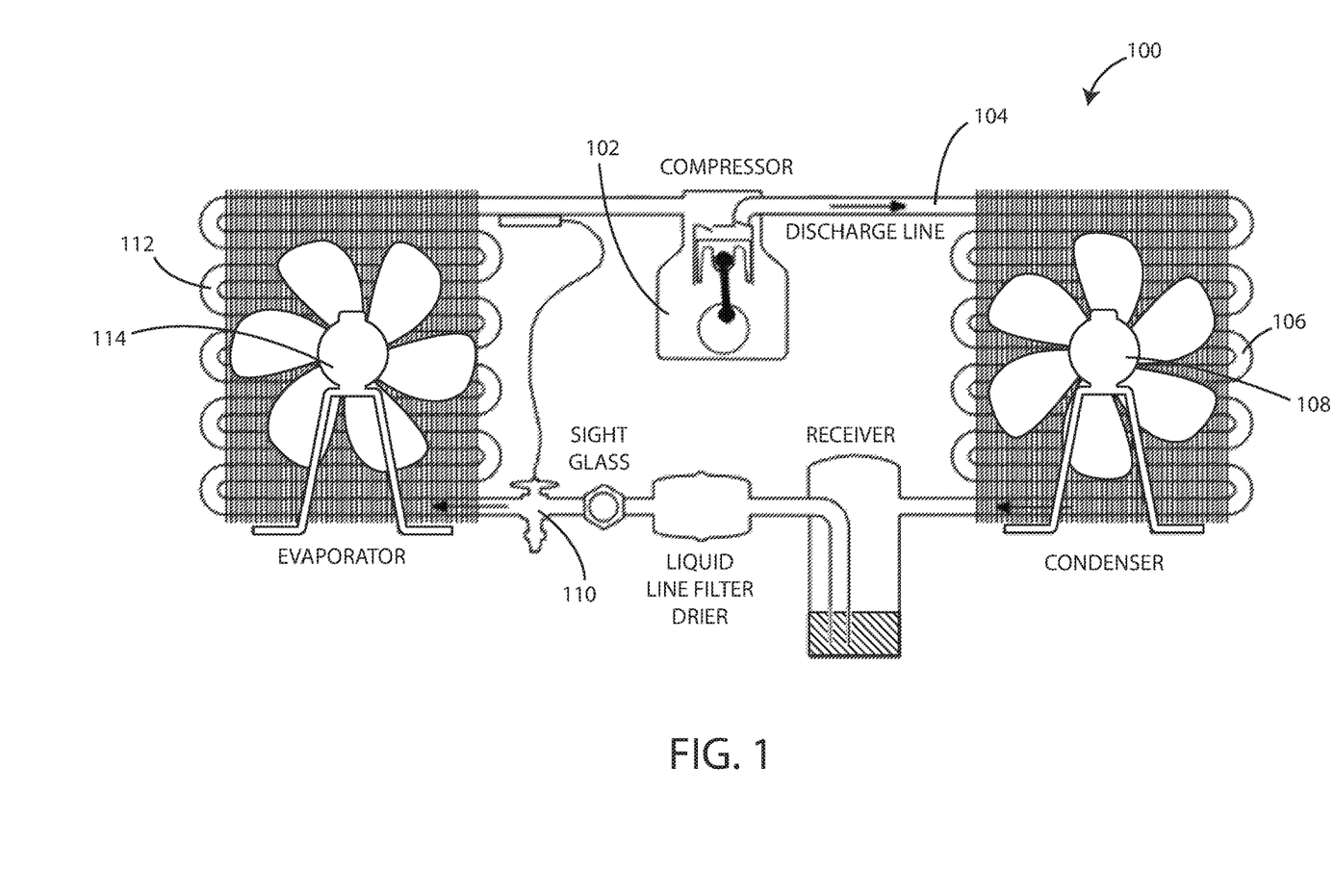
FIG. 1 is schematic diagram of a cooling system according to an embodiment.
Figure 7:
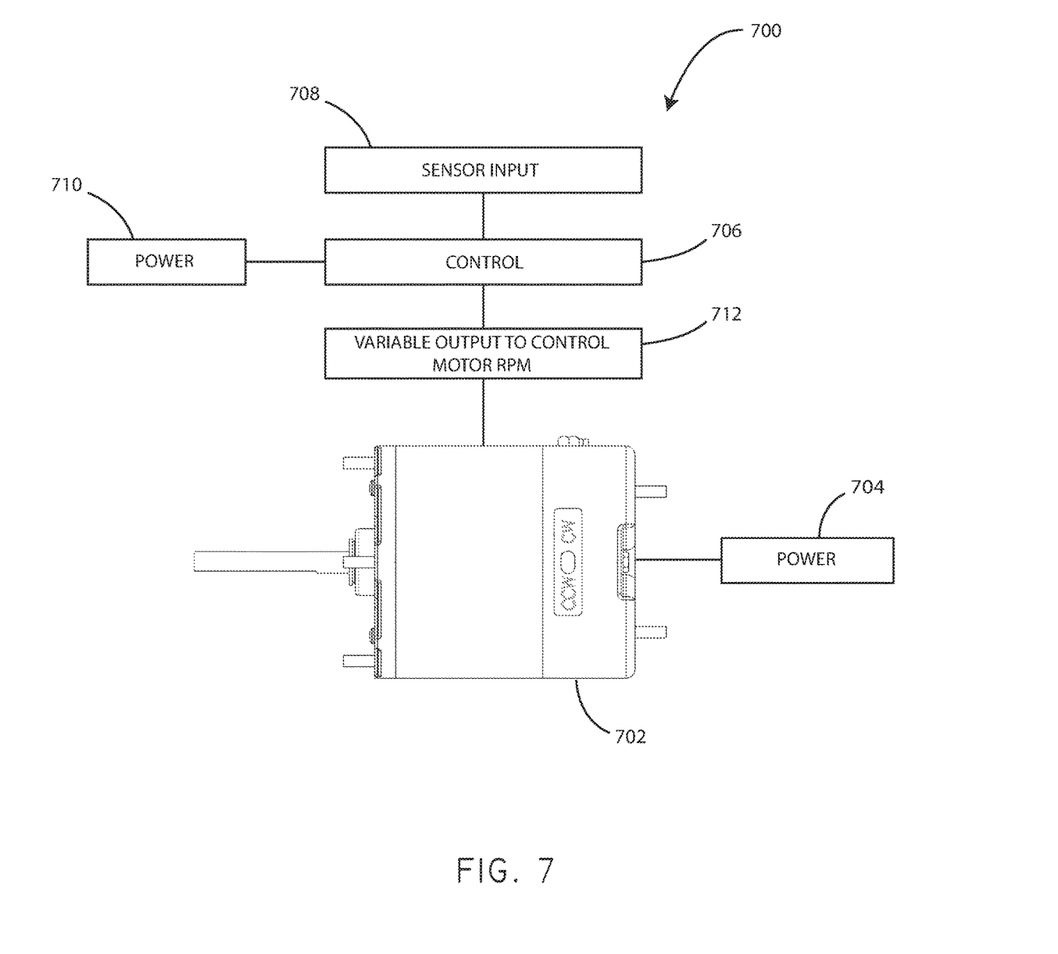
FIG. 7 is a block diagram of a motor control system for a cooling system according to an embodiment.

Embodiments herein can provide an electronically commutated fan motor, a cooling system incorporating such a fan motor, an electronically commutated motor, and methods of controlling a motor, fan motor, and/or the generation of air flow through a cooling system using a fan motor. FIG. 1 is schematic diagram of a cooling system 100 according to one possible embodiment. The cooling system 100 includes a compressor 102 that drives a refrigerant through a line 104 and through multiple components, including a condenser 106, a receiver, a liquid line filter, an expansion valve 110 and an evaporator 112, before flowing back to the compressor 102. The system 100 includes a condenser fan 108 and an evaporator fan 114. Although it is not shown, in some cases the system also includes an electronic control circuit that monitors the state of cooling by the system and adjusts various levels and factors to modify the cooling provided by the system. As one example, such a control circuit may modify the speed of the condenser and/or evaporator fan motor. FIG. 7 provides one example of a possible motor control system for a cooling system.

A significant advantage of some embodiments of the invention that include a variable speed, electronically commutated motor and control system is the ability to maximize the efficiency at which the fan speed is operated. Another significant advantage is the ability to maintain proper airflow across the evaporator coil to ensure that the mechanical aspect of the refrigeration system remains proper. For example, if too much air is moved, energy is wasted on fan speed. If not enough air is moved, the energy spent pressurizing the refrigerant is wasted because maximum BTU transfer at the coil will not be captured. In addition if not enough BTUs are transferred at the coil, it is possible to send the refrigerant back to the compressor in the form of liquid, not gas. This can cause major damage to the compressor. Thus, the variable speed motors and control systems provided by embodiments of the invention can effectively address both energy saving on motor speed and evaporative optimization.

Another significant advantage of the variable speed motor and control is the ability to monitor the evaporative process and optimize the evaporative process by means of fan motor speed control. The reason this is important is this information can be used to more efficiently control the refrigeration system. For example, if the fan motors and control can allow the refrigeration circuit to operate more efficiently, significant energy savings can be captured from the operation of the refrigeration system. The potential of these savings can far outweigh the energy saved by controlling fans at a lesser than high (or normal) speed.

According to some embodiments, an EC motor is used to drive a cooling fan that is part of a refrigeration or cooling system such as the system in FIG. 1. For example, in some cases the flow of coolant within a cooling system is reduced or increased depending upon the amount of cooling needed at a particular time. According to some embodiments, an EC motor provides a continuously adjustable fan speed to provide a customized degree of air flow through an evaporator coil.

Figure 2A:
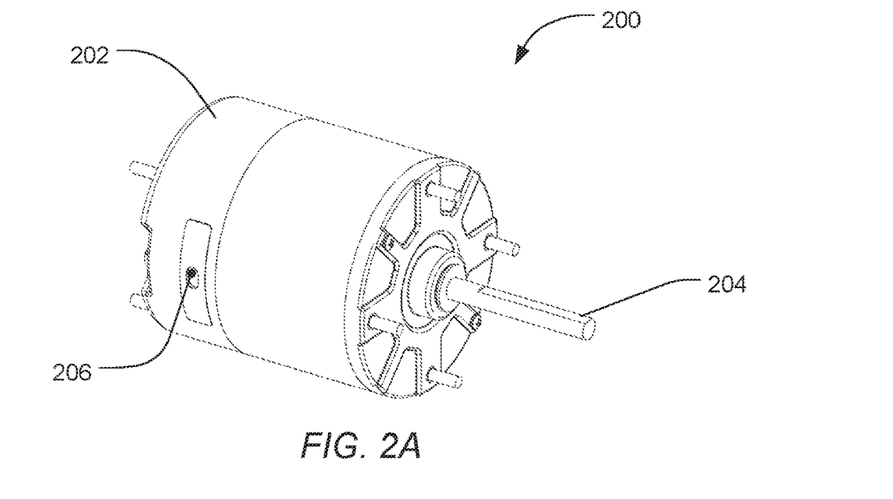
FIG. 2A is a perspective view of a fan motor according to an embodiment.
Figure 2B:
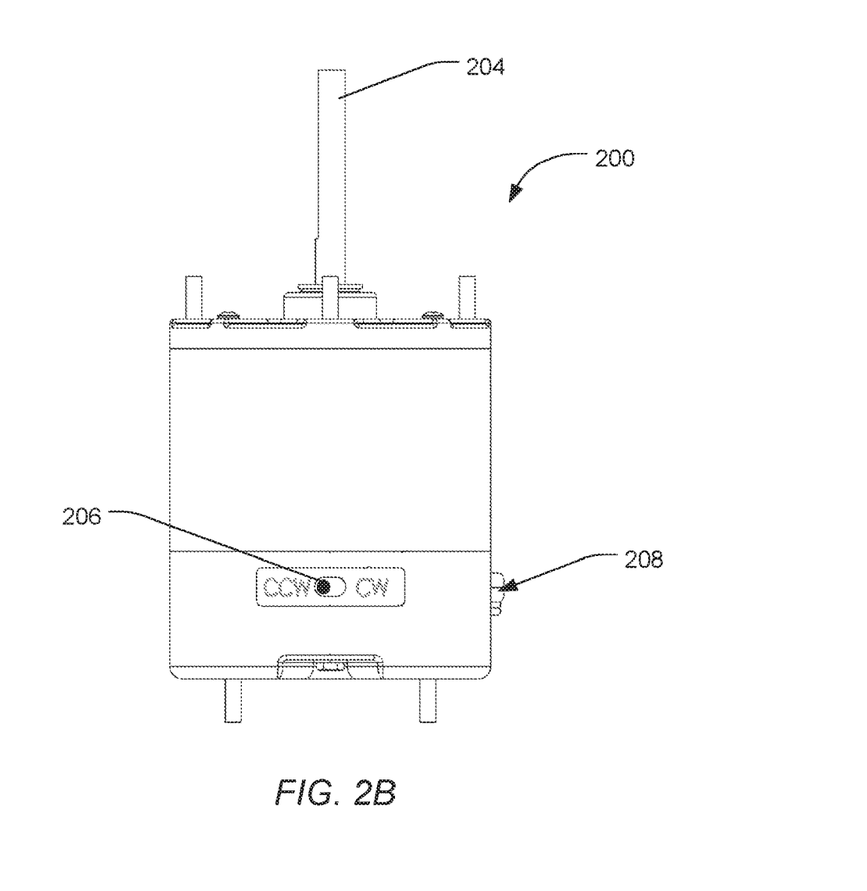
FIG. 2B is a front elevation view of the fan motor of FIG. 2A according to an embodiment.
Figure 2C:
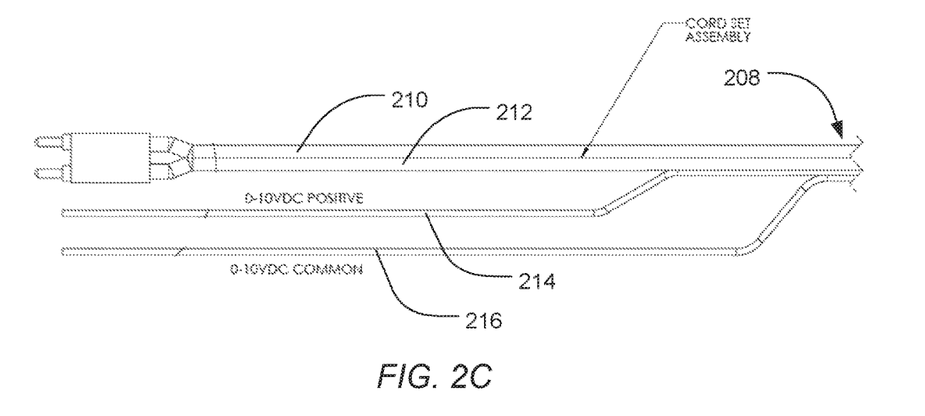
FIG. 2C is a view of a power and control connection assembly for the fan motor of FIG. 2A according to an embodiment.

FIGS. 2A and 2B are perspective and front elevation views of a variable speed, electronically commutated fan motor 200 according to an embodiment. FIG. 2C is a view of a power and control connection assembly 208 for the fan motor 200 according to an embodiment. As shown in the figures, the motor 200 includes a housing 202 that has an exterior wall and a shaft 204 extending out of the housing. A fan blade (not shown) can be coupled to the shaft to generate airflow.

Figure 3:
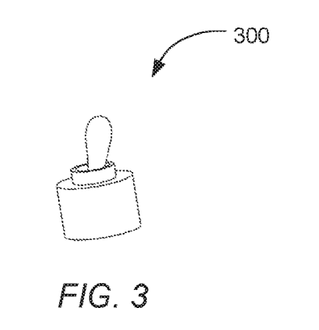
FIG. 3 is a perspective view of a toggle switch according to an embodiment.
Figure 4:
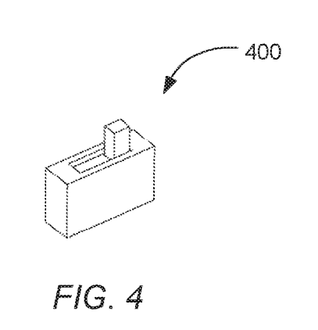
FIG. 4 is a perspective view of a slide switch according to an embodiment.
Figure 5:
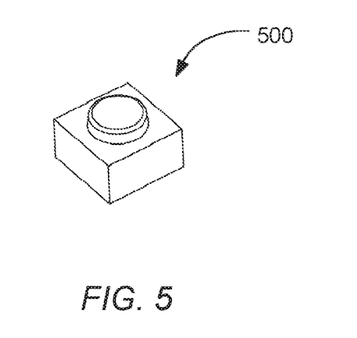
FIG. 5 is a perspective view of a push-button switch according to an embodiment.

The motor 200 also includes a switch 206 that includes a base and an actuator that is accessible outside the housing 202. In this embodiment the actuator is movable between a first actuator position and a second actuator position. The example of the motor 200 shown in FIGS. 2A-2C depicts the switch 206 as a slider switch with a rounded actuator, though any type of switch could be used. FIGS. 3-5 are perspective views of different possible switches according to various embodiments, including a toggle switch 300, a slide switch 400, and a push-button switch 500. Other types of switches may also be used. Unless the context dictates to the contrary, it will be appreciated that the term switch as used herein will also include reference to other specific devices having switch functionality such as buttons and the like.

The switch, or a portion thereof, can be disposed on an outermost portion of the motor housing. In some embodiments, the switch, or a portion thereof, can be disposed on a side of the motor housing or an end of the motor housing. It can be appreciated that the more information that presented to an individual, the less any specific given piece of information will stand out. As such, in order to make the current setting of a switch that controls the direction of spin of the motor stand out, in some cases such a switch can be the only switch or control switch that is visibly disposed on the motor housing.

In some embodiments, either the housing or a portion of the switch can include indicia so as to allow clear visual discernment of the current setting of the switch, such whether the motor is presently configured to spin in a clockwise or counter-clockwise manner. In some embodiments, the indicia can include letters and/or symbols in order to make the direction of spin apparent. The letters and/or symbols can be printed, embossed, engraved, stamped, molded, or the like.

FIGS. 2B and 2C depict the motor's power and control connection assembly 208. As shown in FIG. 2C, the power and control connection assembly 208 in this embodiment includes first and second power connection cables 210, 212 that provide power to the motor 200. According to one embodiment, a motor is provided with a dual voltage feature such that the motor will operate on either 115 volts or 208-230 volts.

The control connection assembly 208 also includes first and second control lines 214, 216 that transmit a control signal from a cooling system electronic control circuit to the motor 200. For example, the control lines 214, 216 may in some cases transmit a signal level that corresponds to a desired speed for the motor 200. As shown in FIG. 2C, in this example the control lines 214, 216 transmit a control signal having a voltage level between 0 VDC and 10 VDC.

According to some embodiments, the control lines 214, 216 only transmit a control signal to the motor 200 in order to control the rotational speed of the motor 200. For example, the control signal provided to the motor 200 may not include control information regarding the desired direction of rotation for the motor 200. In these cases, the motor 200 can include a Dual Rotation feature, in which the motor will operate either clockwise or counter-clockwise. This rotation can be switched in the field by actuating the switch 206. Accordingly, embodiments of the invention provide an advantage over motors with electronically controlled rotation in that the motor 200 does not require a technician's programmer to switch rotation through an electronic control signal. Instead, the rotation can be determined by the position of the switch 206 instead of a voltage signal on the control lines.

According to some embodiments of the invention, a safety mechanism is provided with respect to the motor rotation switch. For example, in some cases the motor controller may be configured to sense whether a power signal is present on the power input connector. In the case that power is applied to the circuit, the controller may disable changes to the motor rotation so that an inadvertent toggling of the switch and/or an intentional attempt to change the rotation direction while the fan is running is ineffective. In these cases, actuating the switch has no effect.

Figure 6:
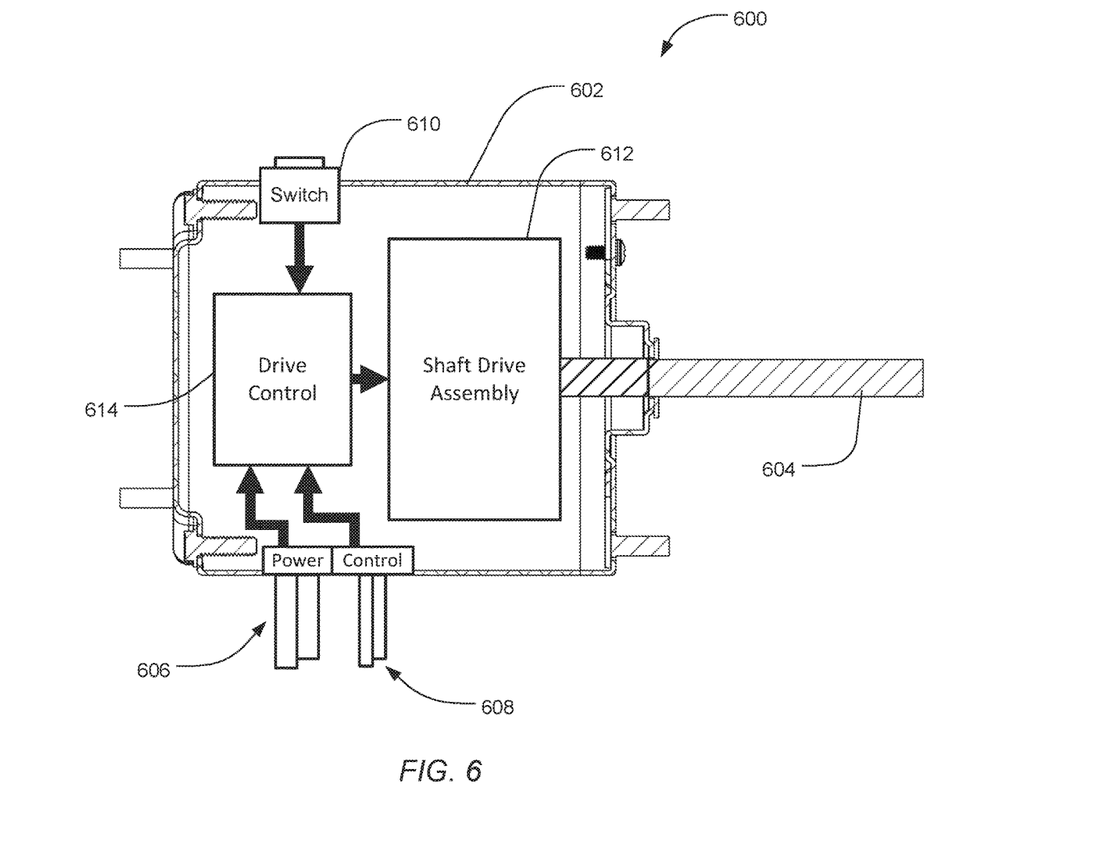
FIG. 6 is a block diagram of a motor according to an embodiment.

FIG. 6 is a block diagram of a motor 600 according to an embodiment of the invention. The block diagram depicts some possible components of the motor 600 using a schematic format. As shown in the drawing, the motor 600 includes components similar to the example of the motor depicted in FIGS. 2A-2C. For example, the motor 600 includes a housing 602 that has an exterior wall. A drive shaft extends through the housing and can be used to rotate a fan blade. The drawing also illustrates a power input connector 606 and a control input connector 608 mounted in the motor's housing 602. The motor 600 further includes a switch 610 mounted in the housing 602. In this example the switch 610 is depicted as a push-button switch, though other types of switches may also be used. As explained above, the switch 610 can be used in this example to change the rotation of the motor shaft 604.

FIG. 6 also depicts the motor 600 as having a shaft drive assembly 612 and a drive control circuit 614, which is also referred to herein as a drive controller, or simply a controller. The controller 614 can be implemented using any suitable technology, and may include, for example, a printed circuit board (PCB) with one or more microchips, such as a microcontroller, a programmable logic controller (PLC), an ASIC, an FPGA, a microprocessor, or other suitable technology. The controller 614 is configured (e.g., programmed and/or hardwired) to receive a control signal from the control input connector 608 and generate a corresponding drive signal for controlling operation of the shaft drive assembly 612. For example, the drive control circuit 614 may be configured to modify the amount of current sent to a stator or armature of the shaft drive assembly 612 based on the level of the signal received on the control input connector 608. Aspects of drive control circuits are described in U.S. Pat. Nos. 4,494,055; 5,023,527; 6,895,176; and 7,019,479, the contents of which related to electronically commutated motors and drive control circuits for the same are herein incorporated by reference.

Figure 8:
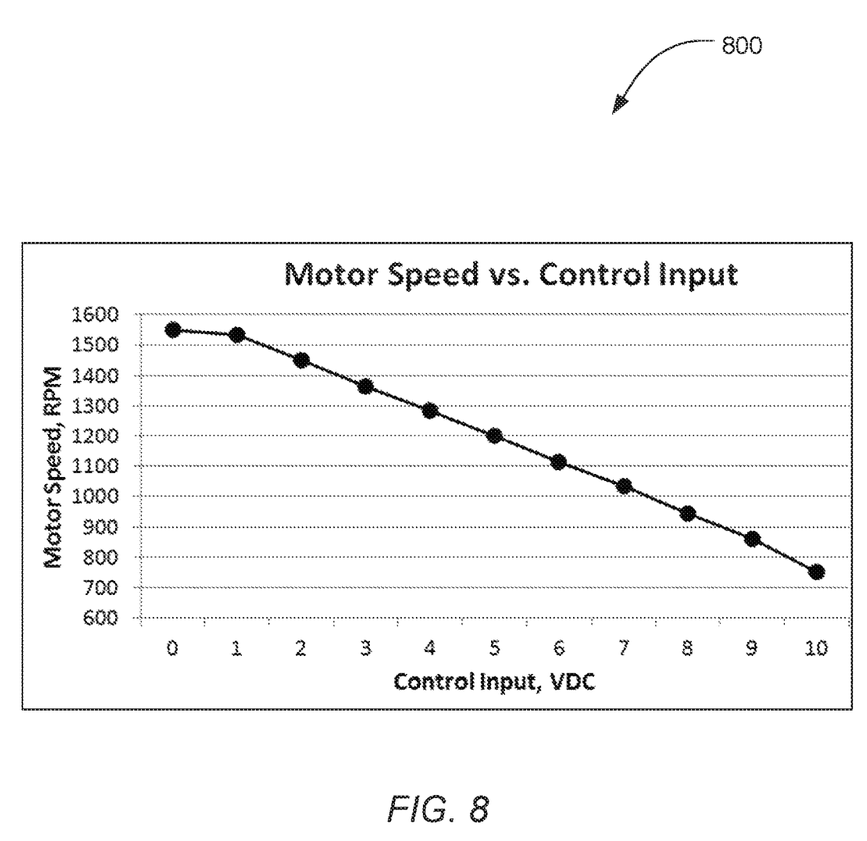
FIG. 8 is a chart depicting a control relationship between a control input and a motor output according to an embodiment.

FIG. 8 depicts one example of a control scheme for controlling the speed of a fan motor based on a control signal. The chart 800 in FIG. 8 depicts a control relationship between a control input and a motor output according to an embodiment. In this embodiment, the control input is a signal with a voltage ranging between 0-10 VDC. As the control input signal changes voltage levels (e.g., as determined by a cooling system control circuit), the speed of the motor also changes. According to the depicted embodiment, the rotation speed is approximately inversely proportional to the control signal magnitude. For example, a low-level control signal of 0 VDC or 1 VDC corresponds to a motor speed of more than 1500 RPM. As the magnitude of the control input increases, the speed of the motor in this example decreases.

While many different motor input/output control schemes are possible, the example in FIG. 8 provides corresponding Control Inputs and Speed Outputs as depicted in Table 1 below:

TABLE 1 input control v. motor speed

| Control Input, VDC | Motor Speed, RPM |
|---|---|
| 0 | 1550 |
| 1 | 1535 |
| 2 | 1450 |
| 3 | 1365 |
| 4 | 1285 |
| 5 | 1200 |
| 6 | 1115 |
| 7 | 1035 |
| 8 | 945 |
| 9 | 860 |

FIG. 7 is a block diagram of a motor control system 700 for a cooling system according to an embodiment. The motor control system 700 includes the motor 702 that is connected to a power source 704. The system includes a control 706, such as a cooling system control circuit, that controls operation of the motor 702 by generating a variable output 712 to the motor. The variable output 712 may vary depending on the sensor input 708 received from one or more sensors in the system 700. The sensors can include, but are not limited to, temperature sensors. Many different types of temperature sensors can be used such as contact and non-contact sensors, thermocouples, thermistors, resistance temperature detectors, infrared sensors, and the like. Such sensors 700 can provide an indication of a level of cooling needed at the moment, which enables the control 706 to customize the speed of the motor 702 to provide just the right amount of air flow across an evaporator or condenser.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

Aspects have been described with reference to various specific and preferred embodiments and techniques. However, it should be understood that many variations and modifications may be made while remaining within the spirit and scope herein.

The invention claimed is:

1. A refrigeration system comprising:
    a refrigerant line coupling a compressor, a condenser, a valve mechanism, and an evaporator;
    an evaporator fan comprising an electronically commutated fan motor;
    a cooling system control circuit electrically coupled to the electronically commutated fan motor; and
    the electronically commutated fan motor comprising
        a motor housing comprising an exterior wall;
        a shaft;
        a shaft drive assembly rotatably coupled to the shaft;
        a power input connector;
        a control input connector;
        a switch attached to the motor housing comprising a base and an actuator accessible outside the motor housing, the actuator comprising a first actuator position and a second actuator position;
        a controller configured to control the shaft drive assembly based on a control signal from the control input connector, a power signal from the power input connector, and a switch signal from the switch;
        wherein operation of the shaft drive assembly and the shaft is characterized by a rotation speed and a rotation direction; and
        the controller is configured to control the rotation direction of the shaft drive assembly and the shaft based on the switch signal and the power signal;
        wherein the controller is configured to switch the direction of rotation in response to the actuator moving from the first actuator position to the second actuator position;
        wherein the controller configured to sense when a power signal is present at the power input connector;
        wherein the controller is configured to disable changes to the rotation direction of the evaporator fan when a power signal is detected at the power input connector; and
    the control circuit configured to provide a control signal to the control input connector for adjusting a speed of a blower fan.

2. The refrigeration system of claim 1, wherein the controller of the electronically commutated fan motor is configured to not switch the direction of rotation based on the power signal.

3. The refrigeration system of claim 2, wherein the controller of the electronically commutated fan motor is configured to not switch the direction of rotation unless the power signal is approximately zero.

4. The refrigeration system of claim 1, wherein the electronically commutated fan motor rotation speed has a range of between about 700 RPM and about 1600 RPM.

5. The refrigeration system of claim 1, wherein a magnitude of the control signal has a range of between about 0V DC and about 10V DC.

6. The refrigeration system of claim 1, wherein the cooling system control circuit is not configured to change the rotational direction of the fan motor.

7. A refrigeration system comprising:
a refrigerant line coupling a compressor, a condenser, a valve mechanism, and an evaporator;
an evaporator fan comprising an electronically commutated fan motor; and
a cooling system control circuit electrically coupled to the electronically commutated fan motor;
the electronically commutated fan motor comprising
a motor housing comprising an exterior wall;
a shaft;
a shaft drive assembly rotatably coupled to the shaft;
a power input connector;
a switch attached to the motor housing comprising a base and an actuator accessible outside the motor housing, the actuator comprising a first actuator position and a second actuator position;
a controller configured to control the shaft drive assembly based on a power signal from the power input connector, a control signal, and a switch signal from the switch;
wherein operation of the shaft drive assembly and the shaft is characterized by a rotation speed and a rotation direction; and
the controller is configured to control the rotation direction of the shaft drive assembly and the shaft based on the switch signal;
wherein the controller configured to sense when a power signal is present at the power input connector;
wherein the controller is configured to disable changes to the rotation direction of the evaporator fan when a power signal is detected at the power input connector;
the control circuit configured to provide a control signal to the control input connector for adjusting a speed of a blower fan.

8. The refrigeration system of claim 7, wherein the switch is directly attached to the motor housing.

9. The refrigeration system of claim 8, wherein the switch is mounted on a surface of the exterior wall of the motor housing that is parallel to a lengthwise axis of the shaft.

10. The refrigeration system of claim 7, wherein the power input connector and the control input connector are mounted on a surface of the exterior wall of the motor housing.

11. The refrigeration system of claim 1, wherein control of rotation direction of the electronically commutated fan motor is provided exclusively by the switch attached to the motor housing.

* * * * *